Feb. 21, 1939.  F. J. RAYBOULD  2,148,038
COUPLING
Filed Nov. 25, 1936  2 Sheets-Sheet 1

INVENTOR
Frank J. Raybould
by his attys.
Stebbins, Blenko & Parmelee

Feb. 21, 1939.  F. J. RAYBOULD  2,148,038
COUPLING
Filed Nov. 25, 1936   2 Sheets-Sheet 2
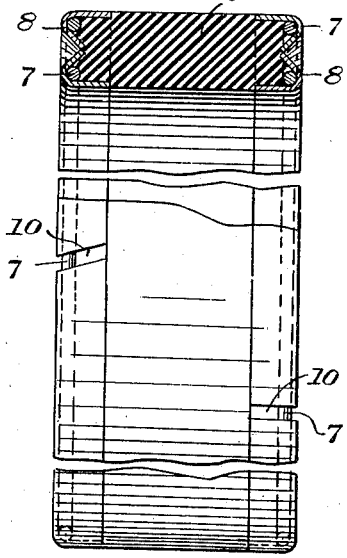
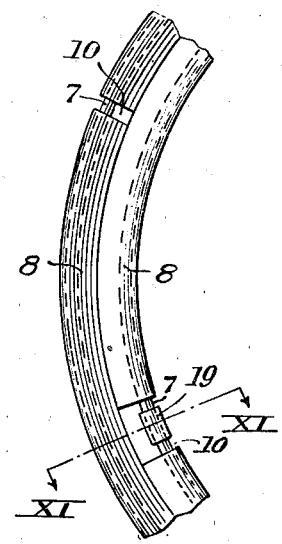
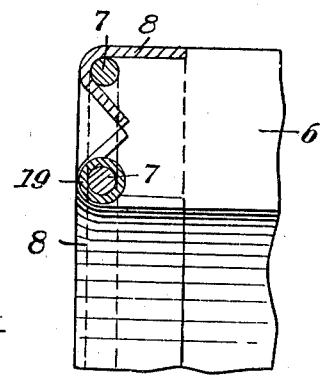
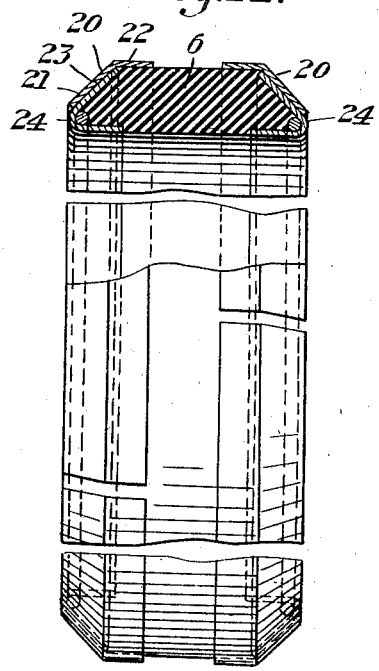
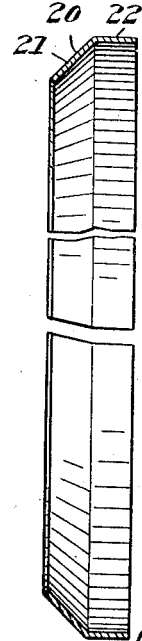
INVENTOR
Frank J. Raybould
by his attys.
Stebbins, Blenko & Parmelee Patented Feb. 21, 1939

2,148,038

UNITED STATES PATENT OFFICE 2,148,038

COUPLING

Frank J. Raybould, Erie, Pa., assignor to Raybould Coupling Company, Meadville, Pa., a corporation of Pennsylvania Application November 25, 1936, Serial No. 112,727

6 Claims. (Cl. 285—135)

The present invention relates to couplings and, more particularly, to couplings wherein the parts are secured together without positive and direct interlocking. The couplings which I provide by my invention are particularly advantageous in relation to conduit or pipe connections, and in this application they will be shown and described in such an environment.

Heretofore considerable difficulty has been experienced with couplings for joining together pipe members due to the axial stresses, the pressures carried by the conduits and the ground vibrations. The prior art couplings have proven inadequate due to these conditions and in many instances leak clamps have been provided in addition to the ordinary couplings in order to assure a permanent and satisfactory connection between the adjacent ends of the conduits. In my prior Patent No. 1,955,831, I have shown a coupling which overcomes many of the difficulties encountered with the prior art couplings. The present invention relates to couplings of this character and provides a coupling which prevents any of the compression ring from being extruded through the free clearances between the coupling proper and the pipe members being joined.

In addition the present invention provides a coupling which can be utilized for joining together the spigot end of one pipe member and the bell end of another pipe member. Heretofore no satisfactory coupling has been found for joining together the bell and spigot ends of ordinary standard bell and spigot pipe. Heretofore it has always been necessary to provide specially formed bell and spigot ends in order to effect a satisfactory joint therebetween. Hence it is one of the objects of the present invention to provide a coupling which can be utilized for joining together standard bell and spigot pipe members so that the joint will remain permanent and will not leak when subjected to the damaging forces to which such conduits are normally subjected.

In the carrying out of the present invention I employ a bushing unit including a compression ring of distortable material, preferably resilient rubber, through which the mechanical forces are transmitted to join the pipe together and at the same time form a leak-proof joint. The bushing unit is interposed between the outer member and the inner member to be joined thereto. I also provide one or more bands or bushings, preferably metallic, extending circumferentially around the resilient compression ring and angularly around at least one corner or edge of the ring of distortable material. The bushings may be either split or slotted at one or more points along the circumference so as to permit them to be contracted or expanded and brought into strong engagement with one of the members to be joined. I also contemplate the use of one or more reinforcing rings extending circumferentially around the compression ring in order to reinforce it and in order to aid in preventing the escape of the distortable material through the openings in the split or slotted metallic bushings. Such reinforcing rings may be split and a sleeve may extend between the ends so that there will be no opportunity for extrusion of the compression ring between the ends thereof. I also propose the use of a seal supported between the ends of at least one of the split bushings, the seal being of a deformable material so that when pressure is applied to the coupling the seal will span the area between the ends of the bushing and prevent the escape of any of the soft compression ring.

In addition the present invention contemplates the use of a bushing guard. The guard may be split or slotted so as to enable it to expand and contract freely with the compression ring. A guard is particularly advantageous where all of the corners of the compression ring are not completely protected by the split or slotted bushings. In such cases it will be so mounted as to protect the exposed corners of the compression ring. A bushing guard is particularly advantageous where a coupling of this character is utilized in the joining together of bell and spigot pipe members. By the use of such a bushing guard the angular type of standard bushing can be utilized in such installation and the material for the compression ring may be of a lower durometer test.

The present invention also contemplates the use of a spacer cooperating with the end of the bushing unit opposite that to which the distorting pressure is applied, for the purpose of maintaining the bushing unit against the pressure applied to the other end thereof and at the same time to allow of ample clearance between the pipe and the other member of the coupling and at the same time to permit the normal expansion and contraction of the pipe. It centralizes the spigot end of pipe in the orifice of the bell and thereby facilitates the assembly of the bushing unit. The spacer which I provide may be metallic or of any suitable composition material depending upon the particular installation. It may be made out of a suitable composition material so as to provide insulation between the members being connected and to cut out any electrolytic action which may occur. It will be understood that the spacer may be either solid or split and that it may be polygon in sectional form or of any other suitable shape.

By providing a spacer of the character above referred to, movement of the pipe under normal expansion and contraction will not interfere in any way with the bushing unit and cause a loosening up of the joint. The spacer which I provide will be so proportioned as to present a retaining wall supported by the inside face of the bell orifice, in the case of the ordinary bell and spigot pipe, and will prevent any extrusion of the compression ring and retain the compression ring in proper location regardless of the clearance between the pipes being connected. The use of such a spacer permits the application of a permanent leak-proof joint to the standard bell and spigot pipe.

In the accompanying drawings I have shown for purposes of illustration only a preferred embodiment of my invention and an alternative form of bushing unit. It will be understood, however, that my invention is not limited to the particular application shown in the drawings and that the seal, bushings, reinforcing rings, and compression ring may assume different forms than those shown. It will also be understood that the seal may be eliminated in any particular installation, that one or more reinforcing rings may be employed, that one or more bushings may be employed, that the guard may be eliminated in any particular installation, that the reinforcing ring sleeve may assume various different forms and be mounted on the reinforcing ring in various different ways, that the bell end spacer may be of entirely different form than that shown, that the compression ring may assume various different shapes, and that various different ways may be employed for applying the pressure for distorting the bushing unit into engagement with the inner and outer members to be connected together.

In the drawings,

Figure 9 is an elevational view, partly in section, of a bushing unit similar to that shown in Figure 2 except with the seal mounted thereon;

Figure 10 is a partial side elevational view of the bushing unit shown in Figure 9;

Figure 11 is a sectional view taken along the line XI—XI of Figure 10;

Figure 12 is an elevational view, partly in section, of a different type bushing unit than that shown in Figures 1, 2 and 9 and showing the bushing guard mounted thereon; and Figure 13 is a sectional view of the bushing guard.

Figure 1:
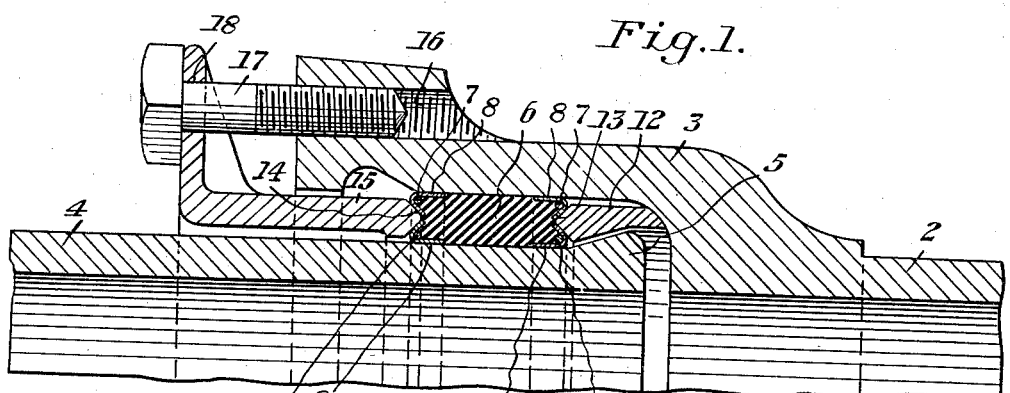
Figure 1 is a partial sectional view through a coupling embodying my invention as applied to the ordinary bell and spigot pipe.
Figure 2:
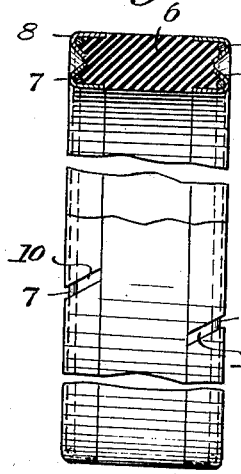
Figure 2 is an elevational view, partly in section, of the bushing unit shown in Figure 1.
Figure 3:
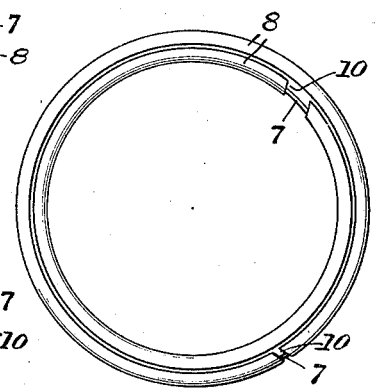
Figure 3 is a side view of the unit shown in Figure 2.

In the drawings the coupling which I provide is shown as applied to the ordinary bell and spigot pipe. As will be understood, the pipe 2 is provided with a bell end 3 of greater circumference than the circumference of the main body of the pipe 2. The pipe 4 to be joined to the pipe 2 is provided with a spigot end 5 which is adapted to fit into the bell end 3 of the pipe 2. The compression ring 6 which is made of distortable material, preferably a resilient rubber, is circular in shape and extends around the spigot end 5 of the pipe 4 between that and the inner surface of the bell end 3 of the pipe 2. The compression ring 6 is provided with reinforcing rings 7 which are located in the crotch of each of the bushings 8 which extend circumferentially around the compression ring 6 and which enclose the corners thereof. The reinforcing rings 7 are split as at 9 so that upon the application of pressure to the bushing unit the reinforcing rings may be expanded or contracted so as to be brought heavily into engagement with either the outer surface of the pipe 4 or the inner surface of the bell 3 of the pipe 2. The bushings 8 enclosing the corner portions of the compression ring 6 and extending horizontally between the compression ring 6 and the surfaces of the pipe 4 and the bell 3 of the pipe 2 are split as at 10 so as to permit them to expand or contract as pressure is applied to the bushing unit for effecting a tight joint between the parts being joined together.

Figure 4:
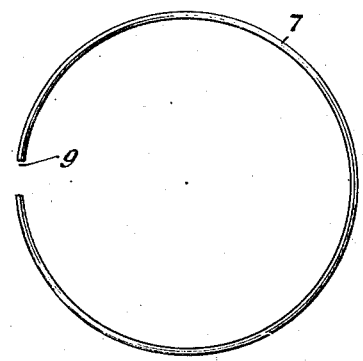
Figure 4 is a plan view of a reinforcing ring.
Figures 5, 8:
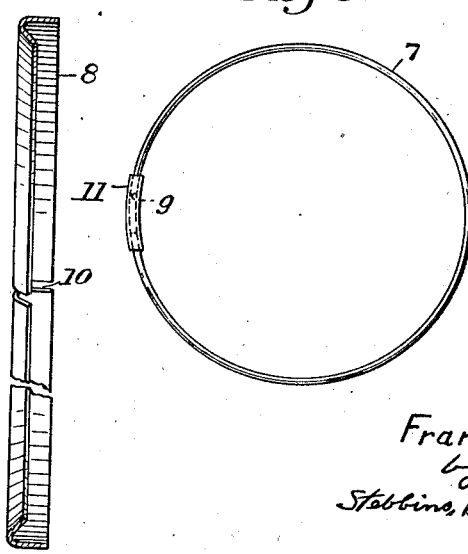
Figure 5 is a plan view of a reinforcing ring with the sleeve mounted in appropriate position thereon.
Figure 8 is a sectional view of a bushing forming a part of the bushing unit shown in Figure 1.
Figure 6:
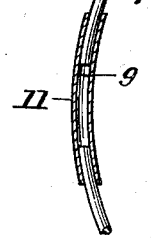
Figure 6 is a detail view of the ring and sleeve shown in Figure 5.

The reinforcing rings 7 may be of the character shown in Figure 4 or may be of the character shown in Figures 5 and 6. In these figures the reinforcing ring is shown as having a sleeve 11 extending across the split or slotted portion. The sleeve 11 may be either loosely maintained in position on the reinforcing ring 7 or it may be welded to one end of the ring, the other end being free to move within the sleeve upon the application of pressure to the bushing unit for effecting the joint. I have found it highly advantageous to employ a sleeve of this character protecting the ends of the reinforcing ring 7 as the use of the sleeve presents a complete retaining ring around the outer diameter of the pipe 4 and the inner wall of the bell end 3 of the pipe 2. This sleeve completely fills in the clearance slot which is necessary for the ring to adjust itself around pipe of varying size. The sleeve 11 also permits free expansion and contraction of the ring by protecting the open ends from the compressed distortable material of the compression ring.

Figure 7:
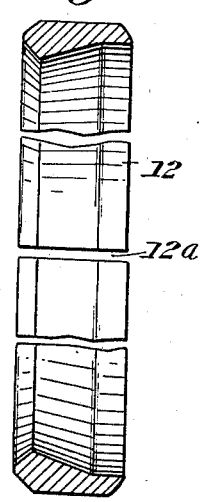
Figure 7 is a sectional view of the bell end spacer shown in Figure 1.

The bushing unit consisting of the compression ring, the reinforcing rings, and the metallic bushings, is maintained in its appropriate position on the pipe 4 by a bell end spacer 12 which is polygon in cross-sectional shape and extends in the form of a ring, either split or solid, around the interior portion of the bell. One end of the spacer 12 cooperates with an end 13 of the bushing unit and the other end thereof bears against the inner surface of the bell 3 of the pipe 2. As stated above, the spacer 12 may be either solid or slotted as indicated at 12a in Figure 7. It will be of suitable shape to fit the particular type of bushing unit and pipe to be employed in any particular installation.

Not only does the bell end spacer maintain the bushing unit in proper position against the pressure applied to the opposite end 14 of the bushing unit by the follower 15, but it also permits free clearance between the pipe 4 and the pipe 2, and thereby permits the normal contraction and expansion of the pipe. Where a spacer of this character is utilized, movements resulting from the normal expansion and contraction of the pipe will not in any way interfere with the bushing unit and cause it to loosen up and present a leaking joint. It also aids in the assembly of the coupling as it will center the spigot end of the pipe in the bell, thereby making it easier to assemble the bushing unit.

The follower 15 is used for applying the pressure to the bushing unit for effecting a tight and strong joint between the coupled members. It will be understood that the follower 15 extends circumferentially around the pipe 4 and engages the end 14 of the bushing unit throughout its periphery. A plurality of threaded openings 16 and bolts 17 are spaced at appropriate intervals throughout the circumference of the bell end of the pipe 2. Each bolt 17 cooperates with a threaded opening 16 and an opening 18 in the follower 15. As the bolts 17 are threaded into the openings 16 the follower 15 is moved to the right as shown in Figure 1 and a strong axial pressure applied to the follower. It will be understood that my invention is not limited to any particular method of applying the necessary pressure to the bushing unit and that a collar can be formed on the bell end for engaging the one end of each bolt for forcing the follower against the bushing unit.

The material of which the compression ring is made, being substantially incompressible but readily distortable, expands radially and the bushing unit, including the compression ring 6, the bushings 8 and the reinforcing rings 7, is brought into strong engagement with the inner surface of the bell 3 and the outer surface of the spigot end of the pipe 4. The joint which is formed thereby is exceedingly high in tensile strength and the pressures applied cannot be in any way released during normal use of the coupling without relieving the pressure applied to the follower 15.

I have found that in some installations it is desirable to provide means in addition to the bushings 8 to prevent extrusion of the distortable material of the compression ring around the pressure applying means. As the bushings 8 are slotted as at 10 there is some possibility that sufficient of the distortable material may be extruded through these slots to relieve sufficient pressure to render the joint insufficiently effective, particularly where an extremely resilient material is used. Accordingly, I propose to provide a seal 19 cooperating with the slot in each bushing 8 cooperating with the inner member of the coupling. Where reinforcing rings are utilized as shown in Figures 9 to 11, inclusive, the seal may take the form of a sleeve 19 placed around the reinforcing ring. The seal 19 will be located in the slot 10 so that when pressure is applied to the bushing unit and the slot 10 is contracted, the ends of the split bushing 8 will close down upon the seal 19 and compress it. As stated above, the seal 19 will be made of a material such as lead which is deformable when subjected to substantial pressures. When the slot 10 in each bushing is contracted and the seal deformed, the seal will completely fill the slot and provide a seal which assures against the extrusion of any of the material of the bushing with the consequent loss of pressure.

As pointed out above, the present invention also contemplates the use of a bushing guard, particularly in installations where all corners of the compression ring are not protected against extrusion thereof around the bushing ends. In Figures 12 and 13 I have shown a bushing guard as applied to a different type of bushing unit than that shown in the remaining figures. As shown, the guard 20 is circular and is provided with angularly disposed sections 21 and 22. The face 21 is adapted to bear against the upwardly extending portion 23 of a bushing 24 and the face 22 is adapted to extend beyond the upper end of the bushing 24 and horizontally along the upper face of the compression ring. Bushing guards of this character are preferably mounted on both sides of a bushing unit. A bushing guard of this character prevents the extrusion of the distortable material around the edges of the metallic bushings, and also enables the use of a standard bushing in various installations, for example, in bell and spigot pipe connections where the pipe sizes vary materially between wide manufacturing tolerances.

When the bushing unit above described is to be used on standard bell and spigot pipe it is necessary to split or slot the entire unit including the compression ring and the bushings in order to permit passing it over the cast collar on the spigot end of the pipe. As shown in the drawings, and as is well known in the art standard spigot pipe contains such a collar and it is of such size as to make the splitting or slotting of the unit necessary. The unit may be split or slotted along a line parallel with the axis of the unit or along a line at an angle thereto. When the collar is not on the pipe, of course, it is not necessary to split or slot the bushing unit.

While I have shown and described several preferred forms of my invention, it will be understood that I do not intend to be limited thereby as my invention may be otherwise embodied within the scope of the appended claims. The various parts such as the bushing guard, the reinforcing rings, the reinforcing ring sleeve, the split or slotted angular bushings, and the bell end spacer may be used in various combinations, one or more of them being omitted, and some of the advantages of my invention obtained.

I claim:

1. In a coupling, the combination of an outer tubular member, an inner member, a bushing unit including a compression ring of bodily distortable material between said inner and outer members and a plurality of split bushings extending circumferentially around the compression ring and extending angularly around a portion thereof, a bushing guard extending circumferentially around said bushing unit and extending angularly about an edge thereof, and means for applying pressure to the bushing unit to contract it axially and expand it radially between the inner and outer members, a portion of said bushing guard extending beyond an edge of one of said split bushings.

2. In a coupling, the combination of an outer tubular member, an inner member, a bushing unit including a compression ring of bodily distortable material between said outer and inner members, a plurality of split bushings extending circumferentially around said compression ring and angularly about the edges thereof, and a seal supported between the ends of at least one of said split bushings, said seal being of a deformable material, and pressure applying means for applying axial pressure to the bushing unit to contract it axially and expand it radially between the inner and outer members, the ends of said split bushings being forced towards each other as axial pressure is applied by the pressure applying means and engaging and deforming said seal therebetween, whereby a seal is effected between the ends of said split bushings.

3. In a coupling, the combination of a pipe member having a bell end, a second pipe member having a spigot end adapted to fit within the bell end, a bushing unit including a compression ring of bodily distortable material within the bell and extending around the spigot end, pressure applying means abutting one end of said bushing unit, a spacer member arranged to engage the other end of the bushing unit and extending between said bushing unit and the shoulder of said bell.

4. In a coupling, the combination of a pipe member having a bell end, a second pipe member having a spigot end adapted to fit within said bell end, a bushing unit including a compression ring of bodily distortable material within the said bell end and extending around said spigot end and at least one bushing extending circumferentially around the compression ring and angularly around an edge thereof, pressure applying means arranged to exert axial pressure on one end of the bushing unit, and a spacer member engaging the other end of said bushing unit and abutting the shoulder of said bell.

5. In a coupling for joining together the bell and spigot ends of bell and spigot pipe members, a compression ring of bodily distortable material between the inner face of the bell member and the outer face of the spigot member, a split reinforcing ring extending circumferentially around said compression ring adjacent an edge thereof, said reinforcing ring being provided with a sleeve cooperating with the ends thereof and adapted to permit at least one end of the ring to slide therein as the compression ring is compressed, pressure applying means cooperating with one end of said compression ring for applying a pressure to the compression ring to contract it in one direction and expand it between said bell and spigot members, and a spacer member cooperating with the other end of said compression ring and abutting the shoulder of said bell member for supporting the compression ring against the pressure applied by the pressure applying means.

6. In a coupling, the combination of a pipe member having a bell end, a second pipe member having a spigot end adapted to fit within said bell end, a bushing unit including a compression ring of bodily distortable material within the said bell and extending around said spigot end and a plurality of bushings extending circumferentially around the compression ring and angularly around the edges thereof, a bushing guard extending circumferentially around the bushing unit and angularly about an edge thereof, pressure applying means arranged to exert axial pressure on one end of said bushing unit, and a spacer member engaging the other end of said bushing unit and abutting the shoulder of said bell.

FRANK J. RAYBOULD.